United States Patent
Miao

(10) Patent No.: US 10,641,940 B2
(45) Date of Patent: May 5, 2020

(54) OPTICAL MODULE OPTICAL INTERFACE ASSEMBLY WITH AN OPTICAL LENS AND MANUFACTURING METHOD THEREOF

(71) Applicant: WUHAN UNICELL TECHNOLOGIES CO., LTD, Wuhan, Hubei (CN)

(72) Inventor: Qizhuang Miao, Hubei (CN)

(73) Assignee: WuHan Unicell Technologies Co., LTD, Wuhan, Hubei (CN)

( * ) Notice: Subject to any disclaimer, the term of this patent is extended or adjusted under 35 U.S.C. 154(b) by 0 days.

(21) Appl. No.: 16/063,247

(22) PCT Filed: Dec. 15, 2016

(86) PCT No.: PCT/CN2016/110073
§ 371 (c)(1),
(2) Date: Jun. 16, 2018

(87) PCT Pub. No.: WO2017/101807
PCT Pub. Date: Jun. 22, 2017

(65) Prior Publication Data
US 2018/0372937 A1    Dec. 27, 2018

(30) Foreign Application Priority Data
Dec. 16, 2015 (CN) .......................... 2015 1 0943877

(51) Int. Cl.
G02B 6/38 (2006.01)
F21V 8/00 (2006.01)
G02B 6/42 (2006.01)

(52) U.S. Cl.
CPC ............ *G02B 6/003* (2013.01); *G02B 6/3809* (2013.01); *G02B 6/4204* (2013.01); *G02B 6/4206* (2013.01); *G02B 6/4292* (2013.01)

(58) Field of Classification Search
CPC .... G02B 6/003; G02B 6/4204; G02B 6/3809; G02B 6/42
See application file for complete search history.

(56) References Cited

U.S. PATENT DOCUMENTS

| | | | |
|---|---|---|---|
| 5,533,159 A * | 7/1996 | Okochi ............... | G02B 6/4207 385/33 |
| 6,793,406 B1 * | 9/2004 | Edwards .............. | G02B 6/4206 385/88 |
| 7,092,171 B2 * | 8/2006 | Kawaguchi ............. | G02B 7/00 359/702 |
| 7,387,449 B2 * | 6/2008 | Meyer-Guldner ... | G02B 6/4204 385/88 |

(Continued)

*Primary Examiner* — Ellen E Kim
(74) *Attorney, Agent, or Firm* — Raymond Y. Chan; David and Raymond Patent Firm

(57) ABSTRACT

An optical module optical interface assembly with an optical lens includes an optical lens, which has a first end surface and a second end surface corresponding to the first end surface, and a connecting body, wherein the connecting body has a molding cavity and the optical lens is retained within the molding cavity. The connecting body has two end portions arranged for mounting an optical subassembly and an external fiber respectively, wherein the first end surface faces towards the end portion for mounting the optical subassembly and the second end surface faces towards the end portion for mounting the external fiber.

4 Claims, 11 Drawing Sheets

(56) References Cited

U.S. PATENT DOCUMENTS

| | | | |
|---|---|---|---|
| 7,540,669 B2* | 6/2009 | Sato | G02B 6/4246 |
| | | | 385/92 |
| 8,259,401 B2* | 9/2012 | Schmieder | G02B 7/025 |
| | | | 359/811 |
| 9,557,515 B2* | 1/2017 | Brinks | G03B 17/12 |
| 2002/0075573 A1* | 6/2002 | Kaneko | G02B 7/022 |
| | | | 359/739 |
| 2003/0147602 A1* | 8/2003 | Takada | G02B 6/4292 |
| | | | 385/93 |
| 2006/0024003 A1* | 2/2006 | Meyer-Guldner | G02B 6/4204 |
| | | | 385/88 |
| 2011/0075021 A1* | 3/2011 | Chang | G02B 7/022 |
| | | | 348/374 |

* cited by examiner

OPTICAL MODULE OPTICAL INTERFACE ASSEMBLY WITH AN OPTICAL LENS AND MANUFACTURING METHOD THEREOF

CROSS REFERENCE OF RELATED APPLICATION

This is a non-provisional application that claims priority to an international application number PCT/CN2016/110073, international filing date Dec. 15, 2016, which entire content is expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to optical communication technology, and more particularly to an optical module optical interface assembly with an optical lens and manufacturing method thereof.

Description of Related Arts

Optical module optical interface assembly, either optical-transmit-optical interface assembly or optical-receive-optical interface assembly, comprises a metal connector, an optical subassembly and an external fiber respectively coupled at two ends of the metal connector, wherein the optical subassembly is retained by a TO retention ring. Commonly, a collimation lens is provided between an illuminant and the metal connector, more generally on the metal connector at an end thereof adjacent to the TO retention ring to ensure and improve the luminous efficiency. Generally, the optical transmitting path is designed from light source-lens-fiber optical ceramic ferrule-external fiber, which should be coupled and aligned for three times. The optical receiving path is generally designed from the external fiber-lens-light source, which should be coupled and aligned twice. The process of coupling and alignment is complicated and relatively costly. Meanwhile, since the optical transmitter and optical receiver use different structure, the cost of material management is increased.

There are many shortcomings associated with the conventional optical module optical interface assembly. First, the structures and types of the optical module optical interface assemblies applied in the transmitting end and the receiving end are different, causing the manufacturing cost of the optical module optical interface assembly unable to be reduced effectively and the management difficulty of which being increased. Further, since the optical-path principle of the optical module optical interface assembly applied to the transmitting end is from the light source-lens-fiber optical ceramic ferrule-external fiber, the components of the optical module optical interface assembly should be aligned and coupled twice in the optical path during the manufacture of the optical module optical interface assembly applied to the receiving end, which not only causes the manufacturing process and cost of the optical module optical interface assembly being increased, but the product's yield and the reliability being deteriorated. In addition, fiber optical ceramic ferrule is utilized in the conventional optical module optical interface assembly, which increases the manufacturing steps and the cost of the optical module optical interface assembly due to the added component for optical module optical interface assembly. Moreover, the fiber optical ceramic ferrule is easily damaged during the manufacture of the optical module optical interface assembly, thereby adversely restricting the production efficiency of the optical module optical interface assembly. Last but not least, the components of the conventional optical module optical interface assembly, such as metal connector, fiber optical ceramic ferrule, lens and the like, are manufactured separately and then assembled together to produce the optical module optical interface assembly, which results in a low accuracy of the conventional optical module optical interface assembly and the conventional optical module optical interface assembly is unable to serve in an environment which requires for a relatively high optical transmission ability.

SUMMARY OF THE PRESENT INVENTION

The invention is advantageous in that it provides an optical module optical interface assembly with an optical lens, which utilize a completely different optical-path design and meets the requirements of both optical transmitting and optical receiving modules with a unified structure. The optical-path of optical transmitting is from light source-optical lens-external fiber and the optical-path of optical receiving is from external fiber-optical lens-light source, which greatly simplifies the structure of the assembly. Meanwhile, the cost of the assembly is significantly reduced due to the elimination of fiber optical ceramic ferrule for the optical transmitting module.

Additional advantages and features of the invention will become apparent from the description which follows, and may be realized by means of the instrumentalities and combinations particular point out in the appended claims.

According to the present invention, the foregoing and other objects and advantages are attained by an optical module optical interface assembly with an optical lens, comprising a metal connector, an optical subassembly and an external fiber respectively coupled at two ends of the metal connector, and a collimating lens, provided in a chamber body, which couples the optical subassembly and the external fiber, within the metal connector, wherein the collimating lens is fitted in the chamber body of the metal connector.

Preferably, the collimating lens has a circle of protruded retention ring structure provided at a side wall thereof, and the chamber body has a circle of concaved retention groove structure provided at the inner wall thereof, wherein the retention ring structure is fitted and installed in an interior of the retention grove structure.

Preferably, the way to affix the metal connector with the collimating lens is that the collimating lens is directly affixed with the metal connector during the formation of the collimating lens.

Preferably, the way to affix the metal connector with the collimating lens is that the collimating lens is affixed to the metal connector in the chamber body thereof by means of cryogenic glass after its formation.

Preferably, the way to affix the metal connector with the collimating lens is that the collimating lens is affixed to the metal connector in the chamber body by means of adhesive after its formation.

The invention is advantageous in that no optical lens is needed between the metal connector and the optical subassembly, while the structure of the TO retention ring can also be simplified. Meanwhile, a retention ring is provided at the engaging portion of the collimating lens and metal connector in order to prevent any unwanted movement within the metal connecter of the collimating lens. This assembly could also meet the requirements of both the optical transmitting and optical receiving modules and the cost thereof is reduced.

Another advantage of the present invention is to provide an optical module optical interface assembly with an optical lens and manufacturing method thereof, wherein the TO retention ring may not be required for the optical module optical interface assembly so as to simplify the structure thereof and facilitate the installation of the optical module optical interface assembly.

Another advantage of the present invention is to provide an optical module optical interface assembly with an optical lens and manufacturing method thereof, wherein the optical module optical interface assembly is capable of being applied both to the transmitting end and to the receiving end, such that there is no necessity to distinguish the types of the optical module optical interface assembly during the installation of the optical module optical interface assembly so as to facilitate the installation, usage and maintenance thereof.

Another advantage of the present invention is to provide an optical module optical interface assembly with an optical lens and manufacturing method thereof, wherein the optical transmitting capability can be guaranteed and improved by the optical module optical interface assembly.

Another advantage of the present invention is to provide an optical module optical interface assembly with an optical lens and manufacturing method thereof, wherein the optical module optical interface assembly comprises a connecting body and an optical lens, wherein the connecting body has a molding cavity arranged for forming the optical lens.

Another advantage of the present invention is to provide an optical module optical interface assembly with an optical lens and manufacturing method thereof, wherein two end portions of the connecting body are arranged for retaining an optical subassembly and an external fiber respectively, such that the optical lens is retained between the optical subassembly and the external fiber.

Another advantage of the present invention is to provide an optical module optical interface assembly with an optical lens and manufacturing method thereof, wherein the connecting body has a first receiving cavity and a second receiving cavity, wherein the molding cavity is extended towards the two end portions of the connecting body to communicate with the first receiving cavity and the second receiving cavity respectively, wherein the optical subassembly can be retained in the first receiving cavity and the external fiber can be retained in the second receiving cavity.

Another advantage of the present invention is to provide an optical module optical interface assembly with an optical lens and manufacturing method thereof, wherein the connecting body enables the optical lens being stably retained between the optical subassembly and the external fiber and prevents contaminants such as external light interfering the interaction positions of the external fiber, the optical lens and the optical subassembly.

Another advantage of the present invention is to provide an optical module optical interface assembly with an optical lens and manufacturing method thereof, wherein at least a portion of the surface of the connecting body is hardened, for instance, the connecting body has a hardened inner wall, thereby significantly increasing the hardness of the inner wall of the connecting body so as to ensure the accuracy of the connecting body and the optical module optical interface assembly assembled by the connecting body. For another example, the connecting body may further be subjected to a nitriding treatment after its formation to increase the hardness of the inner wall of the connection body.

Another advantage of the present invention is to provide an optical module optical interface assembly with an optical lens and manufacturing method thereof, wherein the connecting body has at least one positioning groove and the optical lens has at least one positioning element formed at a peripheral wall thereof, wherein the positioning elements are positioned in the positioning grooves respectively so as to retain the optical lens in the molding cavity of the connecting body.

Another advantage of the present invention is to provide an optical module optical interface assembly with an optical lens and manufacturing method thereof, wherein the positioning groove of the connecting body can be in ring-shape, and the positioning element of the optical lens can be in ring-shape, such that when the positioning element of the optical lens is positioned in the positioning groove of the connecting body, the optical lens is retained in the molding cavity of the connecting body.

Another advantage of the present invention is to provide an optical module optical interface assembly with an optical lens and manufacturing method thereof, wherein in the manufacturing process, the optical lens can be formed in the molding cavity of the connecting body so as to produce the optical module optical interface assembly.

Another advantage of the present invention is to provide an optical module optical interface assembly with an optical lens and manufacturing method thereof, wherein the connecting body can be a metal member, for instance the connecting body can be made of stainless steel material, so as to facilitate the installation of the optical module optical interface assembly with the connecting body.

According to one aspect of the present invention, the present invention provides an optical module optical interface assembly which comprises:

an optical lens, which has a first end surface and a second end surface corresponding to the first end surface;

a connecting body, which has a molding cavity and the optical lens is retained within the molding cavity, wherein the connecting body has two end portions arranged to mount an optical subassembly and an external fiber respectively, wherein the first end surface faces towards the end portion for mounting the optical subassembly and the second end surface faces towards the end portion for mounting the external fiber.

In one embodiment of the present invention, the optical lens is formed in the molding cavity of the connecting body.

In one embodiment of the present invention, the connecting body has at least one positioning groove communicating with the molding cavity, and the optical lens has at least one positioning element, wherein the at least one positioning element of the optical lens is positioned in the at least one positioning groove of the connecting body.

In one embodiment of the present invention, the positioning elements of the optical lens are positioned in the positioning grooves of the connecting body respectively.

In one embodiment of the present invention, the optical lens has one positioning element and the connecting body has one positioning groove, wherein the positioning element of the optical lens is positioned in the positioning groove of the connecting body.

In one embodiment of the present invention, the positioning element of the optical lens is in ring-shape and the positioning groove is in ring-shape, wherein the ring-shaped positioning element of the optical lens is positioned in the ring-shaped positioning groove of the connecting body.

In one embodiment of the present invention, the connecting body has at least one positioning element in the molding cavity and the optical lens has at least one positioning groove, wherein at least one of the positioning elements of the optical lens is positioned in the at least one of the positioning grooves of the connecting body.

In one embodiment of the present invention, the positioning elements of the optical lens are positioned in the positioning grooves of the connecting body respectively.

In one embodiment of the present invention, the positioning element of the optical lens is formed in the positioning groove of the connecting body in such a manner that the positioning element of the optical lens is positioned in the positioning groove of the connecting body.

In one embodiment of the present invention, the optical lens forms the positioning groove at a position corresponding to the positioning element of the connecting body in such a manner that the positioning element of the connecting body is positioned in the positioning groove of the optical lens.

In one embodiment of the present invention, the optical lens is mounted in the molding cavity of the connecting body.

In one embodiment of the present invention, the optical module optical interface assembly further comprises at least one retention element, wherein the connecting body has at least one first retention groove communicating with the molding cavity, and the optical lens has at least one second retention groove corresponding to the at least one first retention groove, wherein the retention element is formed in the at least one first retention groove and the at least one second retention groove simultaneously, such that the optical lens is mounted in the molding cavity of the connecting body.

In one embodiment of the present invention, the second retention grooves of the optical lens are corresponding to the first retention grooves of the connecting body respectively, and the retention elements are respectively formed in the first retention grooves and the second retention grooves simultaneously.

In one embodiment of the present invention, the connecting body has one first retention groove and the optical lens has one second retention groove.

In one embodiment of the present invention, the first retention groove of the connecting body has a ring shape and the second retention groove has a ring shape, wherein the retention element is formed at a portion of the first retention groove and a portion of the second retention groove simultaneously.

In one embodiment of the present invention, the second retention groove is formed at a middle potion of the optical lens.

In one embodiment of the present invention, the second retention groove is formed at the first end surface of the optical lens.

In one embodiment of the present invention, the second retention groove is formed at the second end surface of the optical lens.

In one embodiment of the present invention, the retention element is formed by curing of the adhesive.

In one embodiment of the present invention, the connecting body has a first retention groove communicating with the molding cavity, and the optical lens has a retention element, wherein the retention element is retained in the first retention groove to mount the optical lens in the molding cavity of the connecting body.

In one embodiment of the present invention, the retention element is integrally extended from the first end surface of the optical lens.

In one embodiment of the present invention, the retention element is integrally extended from the second end surface of the optical lens.

In one embodiment of the present invention, the connecting body has a retention element in the molding cavity, and the optical lens has a second retention groove, wherein the retention element is retained in the second retention groove to mount the optical lens in the molding cavity of the connecting body.

In one embodiment of the present invention, the second retention groove is formed at the first end surface of the optical lens.

In one embodiment of the present invention, the second retention groove is formed at the second end surface of the optical lens.

In one embodiment of the present invention, the optical lens is a collimating lens.

In one embodiment of the present invention, the end portions of the optical subassembly and the external fiber are inserted into an interior of the connecting body so as to be coupled at the two end portions of the connecting body respectively, such that the optical subassembly, the optical lens and the external fiber are communicated with each other within the connecting body.

In one embodiment of the present invention, the connecting body has a first receiving cavity and a second receiving cavity and the molding cavity is communicated with the first receiving cavity and the second receiving cavity, wherein the end portion of the optical subassembly is mounted in the first receiving cavity of the connecting body and the end portion of the external fiber is mounted in the second receiving cavity of the connecting body.

In one embodiment of the present invention, the connecting body forms a first tubular retention arm and a second tubular retention arm at the two end portions thereof, wherein the first retention arm forms the first receiving cavity and the second retention arm forms the second receiving cavity, wherein when the end portion of the optical subassembly is mounted in the first receiving cavity, the end portion of the optical subassembly is enclosed by the first retention arm, and when the end portion of the external fiber is mounted in the second receiving cavity, the end portion of the external fiber is enclosed by the second retention arm.

In one embodiment of the present invention, the connecting body comprises a tubular carrier and a hardened layer which is at least formed on the inner surface of the carrier in such a manner to form the inner wall of the connecting body via the hardened layer, wherein the inner wall of the connecting body defines the first receiving cavity, the molding cavity and the second receiving cavity.

In one embodiment of the present invention, the material of the carrier of the connecting body is selected from the group consisting of alloy materials, metal materials, nonmetal materials, and mixtures of metal materials and nonmetal materials.

According to another aspect of the present invention, the present invention further provides an optical module optical interface assembly with an optical lens, comprising:

an optical interface unit which comprises a tubular interface element and an optical lens provided in an interior of the interface member; and a retention arm arrangement which comprises a tubular first retention arm and a tubular second retention arm, wherein the first retention arm and the second retention arm are integrally extended from two end portions of the interface member respectively, wherein the first retention arm forms a first receiving cavity and the second retention arm forms the second receiving cavity, wherein the first end surface and the second end surface of the optical lens are communicated with the external via the first receiving cavity and the second receiving cavity respectively.

In one embodiment of the present invention, the optical lens is a collimating lens.

According to another aspect of the present invention, the present invention further provides an optical module optical interface assembly with a collimating lens, which comprises a metal connector, an optical subassembly and an external fiber, wherein the optical subassembly and the external fiber are coupled at two end portions of the metal connector, wherein optical module optical interface assembly further comprises a collimating lens provides in a chamber body, which connects the optical subassembly and external fiber, in the interior of the metal connector, wherein the collimating lens is fitted in the chamber body of the metal connector.

In one embodiment of the present invention, the collimating lens comprises a circle of retention ring structure protruded from the side wall thereof and the chamber body comprises a circle of retention groove structure intended from an inner wall thereof, wherein the retention ring structure is fitted and mounted in the retention groove structure.

In one embodiment of the present invention, the way to affix the metal connector with the collimating lens is that the collimating lens is directly affixed to the metal connector during the formation of the collimating lens.

In one embodiment of the present invention, the way to affix the metal connector with the collimating lens is that the collimating lens is affixed to the metal connector in the chamber body thereof by means of cryogenic glass after its formation.

In one embodiment of the present invention, the way to affix the metal connector with the collimating lens is that the collimating lens is affixed to the metal connector in the chamber body thereof by means of adhesive after its formation.

According to another aspect of the present invention, the present invention further provides a manufacturing method of an optical module optical interface assembly with an optical lens, which comprises the following steps.

(a) Provide a connecting body which has a molding cavity.

(b) Fill molding material in the molding cavity of the connecting body.

(c) Compress the molding material and form an optical lens in the molding cavity of the connecting body when the molding material is solidified, so as to produce the optical module optical interface assembly.

In one embodiment of the present invention, in the step (c), the molding material is heated to cure so as to form the optical lens in the molding cavity of the connecting body.

In one embodiment of the present invention, in the step (a), the method further comprises the steps of:

(a.1) providing a tubular carrier; and (a.2) hardening a surface of the carrier to produce the connecting body.

In one embodiment of the present invention, in the step (a.2), the carrier is subjected to a nitriding treatment to harden the surface of the carrier so as to produce the connecting body.

In one embodiment of the present invention, after the step (a.2), the method further comprises a step of:

(a.3) removing a hardened layer at an end surface of each of the two end portions of the connecting body to expose the carrier at the two end portions of connecting body.

In one embodiment of the present invention, after the step (a.2), the method further comprises a step of (a.4) grinding an inner wall of the connecting body which forms the molding cavity.

In one embodiment of the present invention, the step (a.4) is prior to the step (a.3). In other words, firstly the inner wall of the connecting body which forms the molding cavity is grinded and then the hardened layer at the end surface of the two end portions of the connecting body is removed so as to expose the carrier at the two end portions of connecting body.

In one embodiment of the present invention, in the step (a), the connecting body has at least one positioning groove, and in the step (c), the optical lens forms at least one positioning element which is positioned in the at least one positioning groove after its formation, such that the optical lens is retained in the molding cavity of the connecting body after optical module optical interface assembly is made.

In one embodiment of the present invention, the optical lens is a collimating lens.

According to another aspect of the present invention, the present invention further provides a manufacturing method of an optical module optical interface assembly with an optical lens, wherein the manufacturing method comprises the following steps.

(A) Provide a connecting body which has a molding cavity.

(B) Provide an optical lens.

(C) Mount the optical lens in the molding cavity of the connecting body to made the optical module optical interface assembly.

In one embodiment of the present invention, in order to retain the optical lens in the molding cavity of the connecting body in the aforementioned method, firstly, add adhesive in the second retention groove of the optical lens, and align the second retention groove of the optical lens with the first retention groove of the connecting body after the optical lens is mounted in the molding cavity such that a portion of the adhesive retained in the first retention groove of the optical lens flows to the first retention groove of the connecting body, and then forms a retention element which is retained at the first retention groove of the optical lens and the second retention groove of the connecting body after the adhesive is solidified, such that the optical lens is retained in the molding cavity of the connecting body.

In one embodiment of the present invention, in the aforementioned method, after the optical lens is mounted in the molding cavity of the connecting body, the second retention groove of the optical lens is corresponding to the first retention groove of the connecting body. Then, apply adhesive to the first retention groove of the connecting body and the second retention groove of the optical lens simultaneously to form a retention member which is retained in the first retention groove of the connecting body and the second retention groove of the optical lens after the adhesive is solidified, so as to retain the optical lens in the molding cavity of the connecting body.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
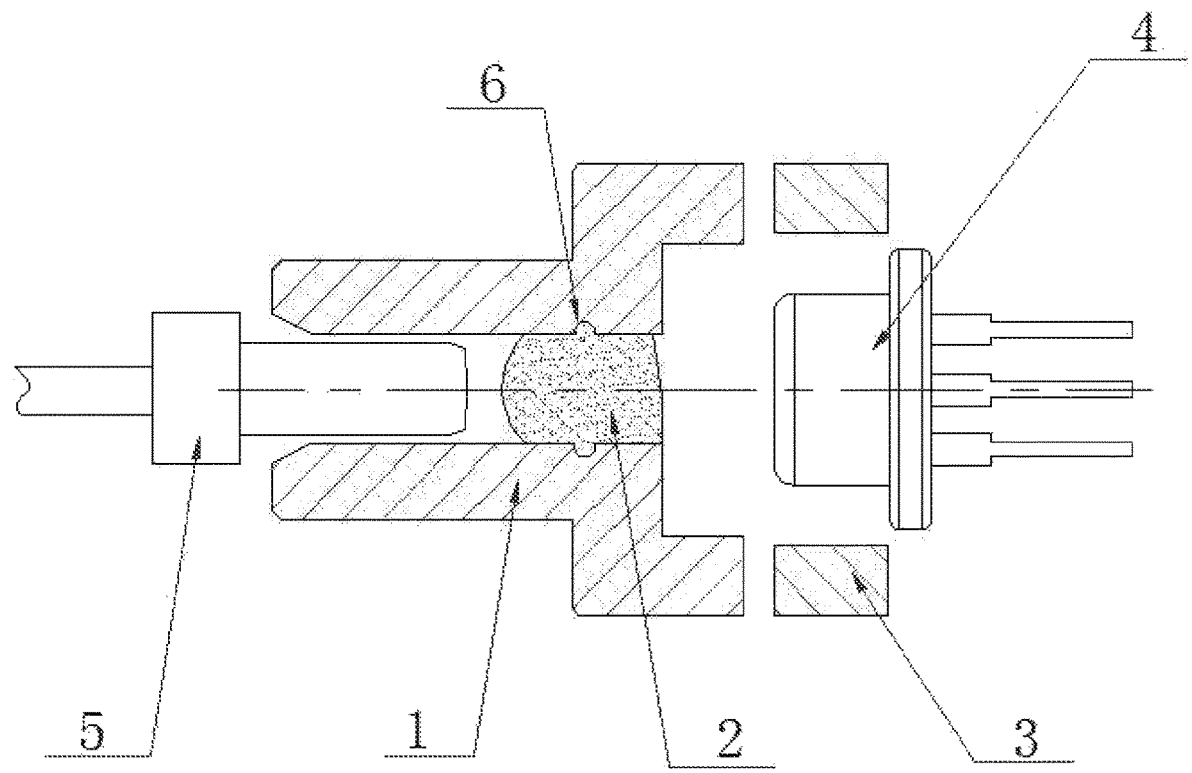
FIG. 1 is a sectional view of an optical module optical interface assembly with an optical lens according to a preferred embodiment of the present invention.
Figure 2:
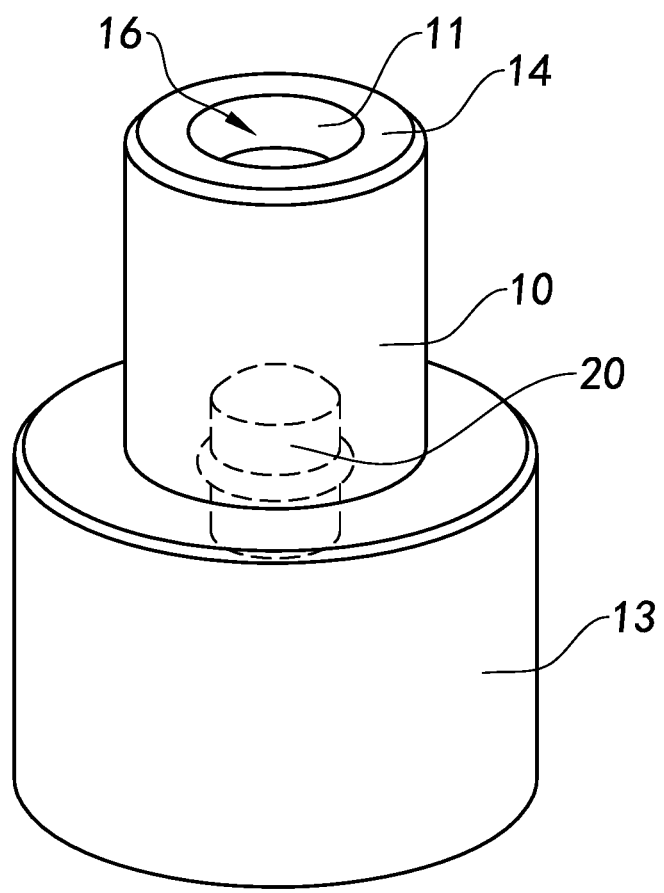
FIG. 2 is a perspective view of an optical module optical interface assembly with an optical lens according to another preferred embodiment of the present invention.

Referring to FIG. 1 of the drawings, an optical module optical interface assembly with a collimating lens according to a first preferred embodiment of the present invention is illustrated, wherein optical module optical interface assembly comprises a metal connector 1, an optical subassembly 30 and an external fiber 40, wherein the optical subassembly 30 and the external fiber 40 are coupled at two ends of the metal connector 1 respectively. The optical module optical interface assembly further comprises a collimating lens 2 provided in a chamber body, which connects the optical subassembly 30 and the external fiber 40 in an interior of the metal connector 1, wherein the collimating lens 2 is engaged in the chamber body of the metal connector 1.

In the preferred embodiment, the collimating lens 2 has a circle of retention ring structure 6 protruded from a side wall thereof, and the chamber body has a circle of retention groove structure indented from an inner wall thereof, wherein the retention ring structure 6 is fittedly mounted in the retention groove structure.

Preferably, the way to affix the metal connector 1 with the collimating lens 2 is that the collimating lens 2 is directly affixed to the metal connector 1 during the formation of the collimating lens 2. Alternatively, the way to affix the metal connector 1 with the collimating lens 2 can be that the collimating lens 2 is affixed to the metal connector 1 in the chamber body thereof by means of cryogenic glass after its formation. Accordingly, no optical lens is needed between the metal connector 1 and the optical subassembly 30 while the structure of the TO positioning ring 3 can be simplified in the present invention. Meanwhile, a retention ring is provided at an engaging portion of the collimating lens 2 and the metal connector 1 in order to prevent any unwanted movement within the metal connecter of the collimating lens 2. This assembly could also meet the requirements of both the optical transmitting and optical receiving modules and no optical lens is required between the optical interface assembly and the light source by directly mounting the collimating lens 2 in the interior of the metal connector 1 so as to reduce its cost.

Referring to FIGS. 2 to 10 of the drawings, an optical module optical interface assembly with optical lens according to another preferred embodiment of the present invention is illustrated, wherein the optical module optical interface assembly with optical lens comprises a connecting body 10 and an optical lens 20. It is worth mentioning that for ease of description and understanding, the optical module optical interface assembly with optical lens is abbreviated as optical module optical interface assembly in the following description of the present invention. Those who skilled in the art would easily understand that simplifying the optical module optical interface assembly with optical lens as the optical module optical interface assembly should not be considered as a limitation of the content and scope of the present invention. In other words, the optical module optical interface assembly comprises the connecting body 10 and the optical lens 20.

Figure 3:
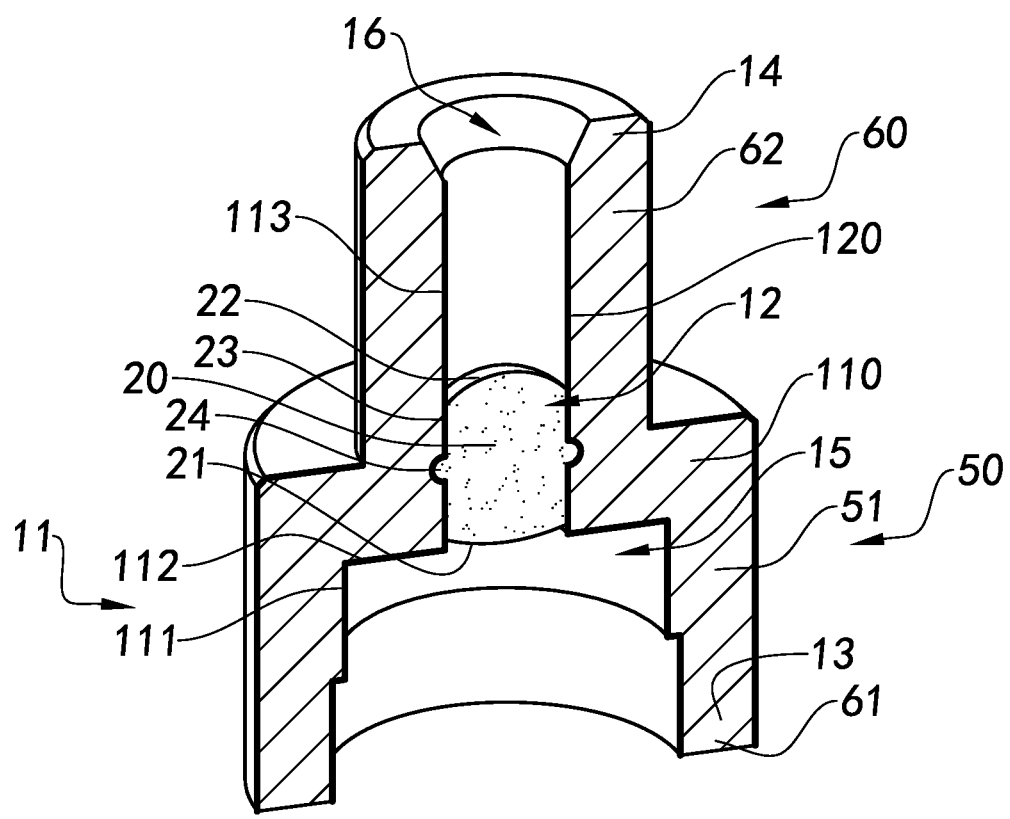
FIG. 3 is a sectional view of the optical module optical interface assembly with the optical lens according to the above preferred embodiment of the present invention.

Further, as shown in FIG. 3, the connecting body 10 has an inner wall 11, wherein the inner wall 11 defines a molding cavity 12. In other words, the connecting body 10 has the molding cavity 12 which is arranged for forming the optical lens 20.

The optical lens 20 has a first end surface 21 and a second end surface 22, wherein the first end surface 21 and the second end surface 22 of the optical lens 20 are corresponding with each other. Though, the first and second end surfaces 21, 22 of the optical lens 20 are both embodied as convex surface as illustrated in the FIG. 3 as an example to illustrate the features and advantages of the optical module optical interface assembly. Those who skilled in the art would easily understand that the first and second end surface 21, 22 of the optical lens 20 are not limited to convex surface. For example, the first and second end surfaces 21, 22 of the optical lens 20 can be embodied as flat surface, concave surface or any other aspherical surface. Therefore, the types of the first and second end surfaces 21, 22 of the optical lens 20 of the optical module optical interface assembly are not limited in the present invention.

The optical lens 20 is formed and retained in the molding cavity 12 of the connecting body 10 to produce the optical module optical interface assembly, wherein the first end surface 21 and the second end surface 22 of the optical lens 20 are corresponding to two end portions of the connecting body 10 respectively. For example, the first and second end surfaces 21, 22 of the optical lens 20 face towards the two end portions of the connecting body 10 respectively.

More specifically, the connecting body 10 further has a first connecting end 13 and a second connecting end 14 corresponding to the first connecting end 13, wherein the inner wall 11 of the connecting body 10 is extended towards the two end portions of the connecting body 10 to joint with the first connecting end 13 and the second connecting end 14 of the connecting body 10 respectively. When the optical lens 20 is mounted in the molding cavity 12 of the connecting body 10, the first end surface 21 of the optical lens 20 faces towards the first connecting end 13 of the connecting body 10 and the second end surface 22 of the optical lens 20 faces towards the second connecting end 14 of the connecting body 10.

The connecting body 10 is arranged for coupling an optical subassembly 30 and an external fiber 40, wherein when the optical subassembly 30 and the external fiber 40 are connected to the connecting body 10, the optical lens 20 is retained between the optical subassembly 30 and the external fiber 40 while the first end surface 21 of the optical lens 20 faces towards the optical subassembly 30 and the second end surface 22 of the optical lens 20 faces towards the external fiber 40.

Further, the optical subassembly 30 is mounted on the first connecting end 13 of the connecting body 10 and the external fiber 40 is mounted on the second connecting end 14 of the connecting body 10 in such a manner that the optical subassembly 30 and the external fiber 40 are coupled to the connecting body 10.

Preferably, the end portion of the optical subassembly 30 is inserted into the interior of the connecting body 10 from the first connecting end 13 thereof in such a manner that the optical subassembly 30 is mounted on the connecting body 10. Accordingly, the end portion of the external fiber 40 is inserted into the interior of the connecting body 10 from the second connecting end 14 thereof in such a manner that the external fiber 40 is mounted on the connecting body 10. Accordingly, the optical subassembly 30, the optical lens 20 and the external fiber 40 are interacted with each other within the connecting body 10 so as to prevent any contaminants, such as external light, interfering the interaction positions of the external fiber 40, the optical lens 20 and the optical subassembly 30, thereby ensuring and improving the optical transmission capacity.

It is worth mentioning that when the end portion of the optical subassembly 30 is inserted into the interior of the connecting body 10 from the first connecting end 13 thereof and the end portion of the external fiber 40 is inserted into the interior of the connecting body 10 from the second connecting end 14 thereof, wherein the optical subassembly 30 maintains a certain distance with the first end surface 21 of the optical lens 20 and the external fiber 40 maintains a certain distance with the second end surface 22 of the optical lens 20. In other words, the optical subassembly 30 is not directly contacted with the first end surface 21 of the optical lens 20 and the external fiber 40 is not directly contacted with the second end surface 22 of the optical lens 20 either.

The inner wall 11 of the connecting body 10 defines the first receiving cavity 15 and the second receiving cavity 16 at the first connecting end 13 and the second connecting end 14 of the connecting body 10 respectively. In other words, the connecting body 10 has the first receiving cavity 15 and the second receiving cavity 16 at the first and second connecting ends 13, 14 thereof respectively. The molding cavity 12 is extended towards the first connecting end 13 and the second connecting end 14 to communicate with the first receiving cavity 15 and the second receiving cavity 16.

Figure 4:
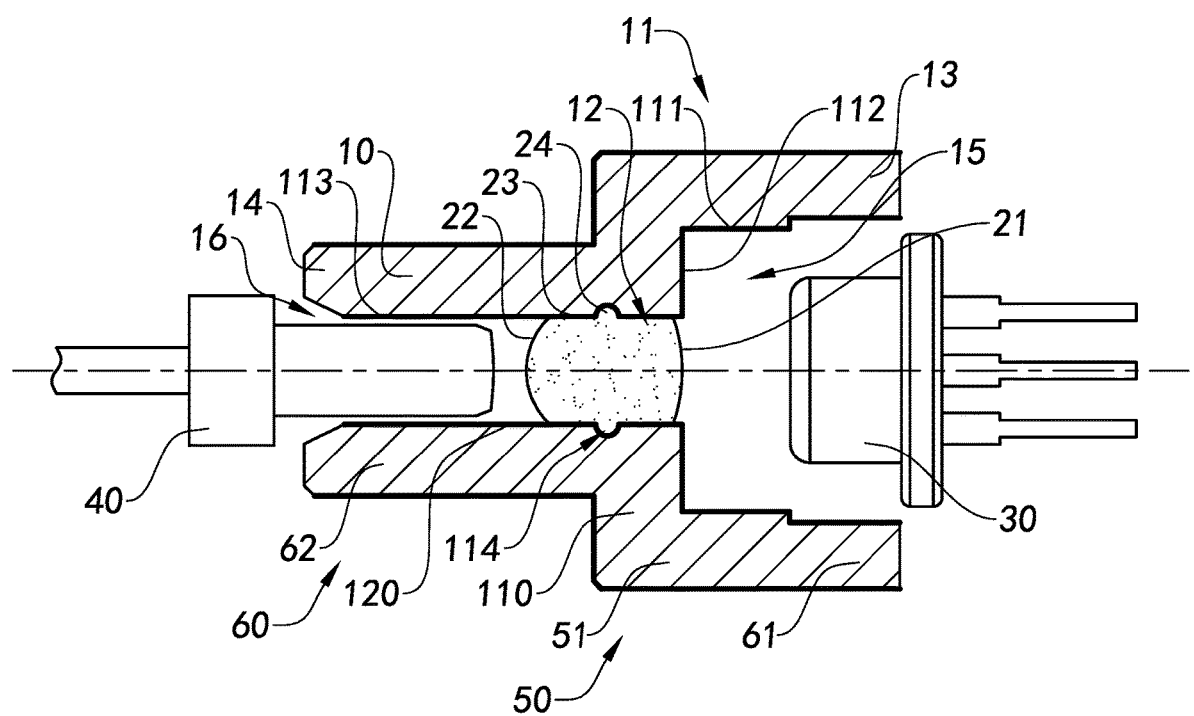
FIG. 4 is a sectional view of the optical module optical interface assembly with the optical lens when being applied according to the above preferred embodiment of the present invention.

As shown in FIG. 4, the end portion of the optical subassembly 30 is mounted and retained in the first receiving cavity 15 of the connecting body 10 and the end portion of the external fiber 40 is mounted and retained in the second receiving cavity 16 of the connecting body 10, such that the optical subassembly 30 and the external fiber 40 are coupled to the connecting body 10.

It would be easily understood that when the optical subassembly 30 is mounted in the first receiving cavity 15 of the connecting body 10 through the first connecting end 13 thereof and the external fiber 40 is mounted in the second receiving cavity 16 of the connecting body 10 through the second connecting end 14 thereof, the central axes of the optical subassembly 30, optical lens 20 and the external fiber 40 are coaxial with each other to ensure the optical transmission capability of the fiber.

After the optical subassembly 30 is mounted in the first receiving cavity 15 of the connecting body 10 through the first connecting end 13 thereof and the external fiber 40 is mounted in the second receiving cavity 16 of the connecting body 10 through the second connecting end 14 thereof, the method that enables the central axes of the optical subassembly 30, optical lens 20 and the external fiber 40 to be coaxial with each other should not be considered as a limitation in the present invention.

For example, in one embodiment of the present invention, the central axis of the optical lens 20 is coaxial with that of the connecting body 10 after the optical lens 20 is formed in the molding cavity 12 of the connecting body 10. Then, after the optical subassembly 30 and the external fiber 40 are mounted in the first receiving cavity 15 and second receiving cavity of the connecting body 10 respectively, the central axis of the optical subassembly 30 and the central axis of the external fiber 40 are aligned to coincide with the central axis of the connecting body 10, such that the central axes of the optical subassembly 30, optical lens 20 and the external fiber 40 are coaxial with each other to ensure the optical transmission capability of the fiber.

In another embodiment of the present invention, the central axis of the optical lens 20 is coaxial with that of the connecting body 10 after the optical lens 20 is formed in the molding cavity 12 of the connecting body 10. Then, after the optical subassembly 30 and the external fiber 40 are mounted in the first receiving cavity 15 and second receiving cavity of the connecting body 10 respectively, the central axis of the optical subassembly 30 and the central axis of the external fiber 40 are aligned to directly coincide with the central axis of the optical lens 20.

In addition, in one embodiment of the optical module optical interface assembly of the present invention, the inner wall 11 of the connecting body 10 can be an entire surface. In other words, the inner diameters of the first receiving cavity 15, the molding cavity 12 and the second receiving cavity 16 of the connecting body 10 are the same.

In another embodiment of the optical module optical interface assembly of the present invention, the inner wall 11 of the connecting body 10 further has a first inner wall 111, a second inner wall 112 and a third inner wall 113, wherein the first inner wall 111 is positioned at the first connecting end 13 of the connecting body 10 to define the first receiving cavity 15, and the third inner wall 113 is positioned at the second connecting end 14 of the connecting body 10 to define the second receiving cavity 16, while the second inner wall 112 are connected to the first inner wall 111 and the third inner wall 113 respectively. Preferably, the first inner wall 111 can be perpendicular to the second inner wall 112 and the second inner wall 112 can be perpendicular to the third inner wall 113, as shown in FIG. 3.

It is worth mentioning that although the inner diameter of the molding cavity 12 defined by the first connecting end 13 is same to that of the second receiving cavity 16 as shown in the FIG. 3 as an example, the molding cavity 12 and the second receiving cavity 16 can also be formed by inner walls with different inner diameters in other embodiments of the present invention. In other words, the inner diameters of the molding cavity 12 and the second receiving cavity 16 can be different, which should not be considered as a limitation of the optical module optical interface assembly in the present invention.

Further, referring to FIG. 3 of the drawings, the optical lens 20 has a peripheral wall 23 which is extended towards the first end surface 21 and the second end surface 22 of the optical lens 20 to joint with the first end surface 21 and the second end surface 22 at the peripheral edges thereof respectively. After the optical lens 20 is formed in the molding cavity 12 of the connecting body 10, the peripheral wall 23 of the optical lens 20 is attached to the inner wall 11 of the connecting body 10 at a portion which defines the molding cavity 12, such that the relative positions of the optical lens 20 and the connecting body 10 will not be changed, so as to improve the product's yield of the optical module optical interface assembly.

In other words, the optical lens 20 is fitted with the inner wall 11 of the connecting body 10 by attaching the peripheral wall 23 of the optical lens 20 to the inner wall 11 of the connecting body 10, such that during transportation or installation of the optical module optical interface assembly, the relative positions of the optical lens 20 and the connecting body 10 will not be changed, especially the optical lens 20 would not make any radial movement relative to the connecting body 10, so as to ensure that the central axes of the optical lens 20 and the connecting body 10 are coaxial with each other.

Further referring to FIG. 3 of the drawing, the inner wall 11 of the connecting body 10 further has at least one positioning groove 114 which is communicated with the molding cavity 12. The optical lens 20 has at least one positioning element 24, wherein when the optical lens 20 is formed in the molding cavity 12 of the connecting body 10, the positioning elements 24 are formed in the positioning grooves 114 respectively in order to retain the optical lens 20 in the molding cavity 12 of the connecting body 10. In addition, the positioning elements 24 of the optical lens 20 are able to incorporate with the positioning grooves 114 of the connecting body 10 respectively to prevent the optical lens 20 making any axial movement relative to the connecting body 10, so as to ensure the accuracy of the optical module optical interface assembly.

In one embodiment of optical module optical interface assembly of the present invention, there is a plurality of positioning grooves 114 of the connecting body 10 which are spacedly provided on the inner wall 11. Preferably, the distance between any two of the adjacent positioning grooves 114 is equal. The number, positions, and sizes of the positioning elements 24 of the optical lens 20 are matched with the number, positions and sizes of positioning grooves 114 of the connecting body 10.

In another embodiment of optical module optical interface assembly of the present invention, there is only one positioning groove 114 of the connecting body 10, which is preferably in ring shape. Accordingly, the connecting body 10 has one ring-shaped positioning groove 114. The number of the positioning element 24 of the optical lens 20 can also be only one, and preferably, the positioning element 24 has a ring shape. In other words, the optical lens 20 has a ring-shaped positioning element 24. The optical lens 20 is securely retained in the molding cavity 12 of the connecting body 10, when the positioning element 24 of the optical lens 20 is positioned in the positioning groove 114 of the connecting body 10.

Figure 11:
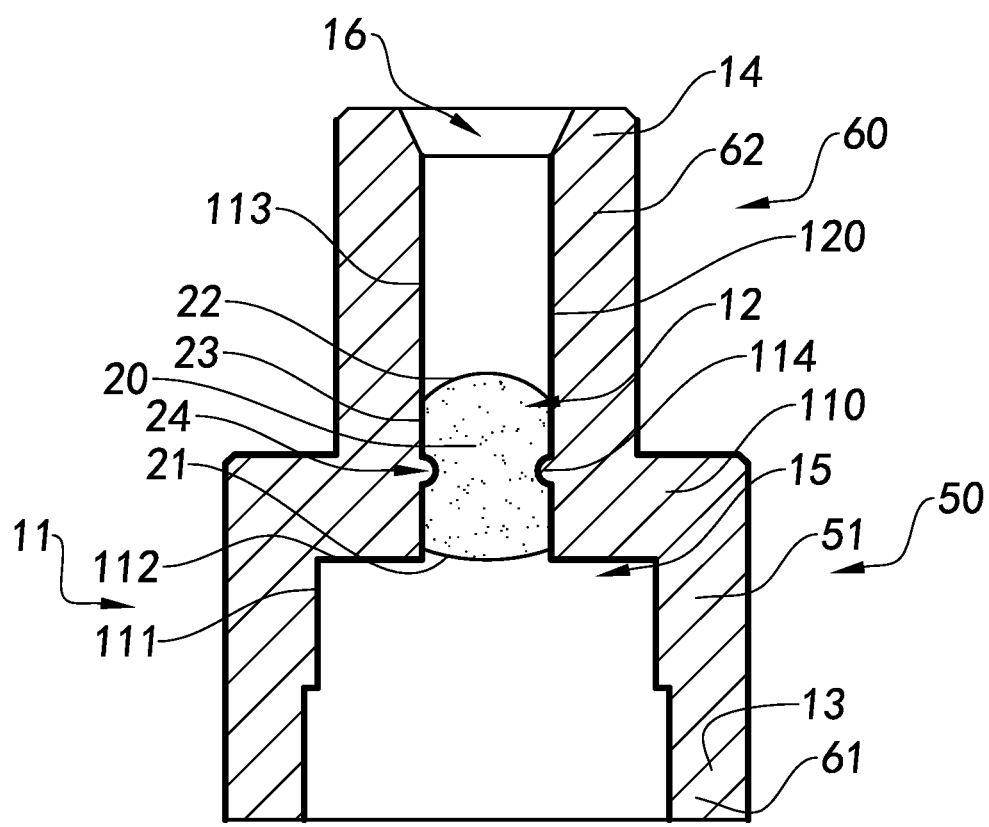
FIG. 11 is a sectional view of a first alternative mode of the optical module optical interface assembly of the above preferred embodiment of the present invention.

Referring to FIG. 11, an alternative mode of the optical module optical interface assembly according to the above preferred embodiment of the present invention is illustrated, wherein the optical lens 20 has the positioning groove 114 and the connecting body 10 has the positioning element 24 provided on the inner wall 11 thereof, such that the positioning element 24 of the connecting body 10 is positioned in the positioning groove 114 of the optical lens 20 in order to form and retain the optical lens 20 in the molding cavity 12 of the connecting body 10.

According to another aspect of the present invention, the optical module optical interface assembly further comprises an optical interface unit 50 and a retention arm arrangement 60.

The optical interface unit 50 comprises a tubular interface element 51 and the optical lens 20, wherein the interface element 51 is formed in the molding cavity 12 and the optical lens 20 is mounted in the molding cavity 12 in order to retain the optical lens 20 in the interface element 51.

The retention arm arrangement 60 comprises a tubular first retention arm 61 and a tubular second retention arm 62, wherein the first retention arm 61 and second retention arm 62 are extended from two ends of the interface element 51 respectively. The first retention arm 61 forms the first receiving cavity 15 which is arranged for receiving the optical subassembly 30 and the second retention arm 62 forms the second receiving cavity 16 which is arranged for receiving the external fiber 40.

It is worth mentioning that when the end portion of the optical subassembly 30 is mounted in the first receiving cavity 15 formed by the first retention arm 61, the end portion of the optical subassembly 30 is surrounded by the first retention arm 61. Preferably, the first retention arm 61 further has at least one retention channel communicated with the first receiving cavity 15 and the external environment of the connecting body 10, wherein when the end portion of the optical subassembly 30 is mounted in the first receiving cavity 15 formed by the first retention arm 61, the optical subassembly 30 can be affixed with the first retention arm 61 outside the first retention arm 61 via each of the retention channels, so as to prevent the optical subassembly 30 moving relative to the connecting body 10, thereby ensuring the reliability of the optical module optical interface assembly when it is used.

Accordingly, when the end portion of the external fiber 40 is mounted in the second receiving cavity 16 formed by the second retention arm 62, the end portion of the external fiber 40 is surrounded by the second retention arm 62.

Preferably, the optical lens 20 of the optical module optical interface assembly in the present invention can be embodied as a collimating lens 2 for collimating the light when passing through the optical lens 20, so as to improve the accuracy of the optical module optical interface assembly and the reliability of the optical module optical interface assembly when it is used.

In addition, please further referring to FIG. 3, the connecting body 10 further comprises a carrier 110 and a hardened layer 120, wherein the carrier 110 has a tubular shape and the hardened layer 120 is formed on the surface of the carrier 110. In other words, the inner wall 11 of the connecting body 10 is formed by the hardened layer 120 in such a manner to enhance the accuracy of the optical module optical interface assembly. When the optical subassembly 30 and external fiber 40 are mounted in the first receiving cavity 15 and second receiving cavity of the connecting body 10 respectively, the optical subassembly 30 and the external fiber 40 are contacted with the hardened layer 120 of the connecting body 10 in such a manner, for one condition, to ensure that the central axes of the optical subassembly 30, the optical lens 20 and the external fiber 40 are coaxial with each other and, for another, to ensure the accuracy of the optical module optical interface assembly even if it has been mounted into and detached from the first receiving cavity 15 and second receiving cavity respectively for many time during which the optical subassembly 30 and the external fiber 40 are repeatedly contacted and rubbed with the hardened layer 120 without causing wear of the hardened layer 120.

In one embodiment of the present invention, the carrier 110 and the hardened layer 120 of the connecting body 10 can be made of different materials. For instance, the carrier 110 can be formed first, and then the hardened layer 120 on the inner wall of the carrier 110 is formed. In another embodiment of the present invention, the carrier 110 and the hardened layer 120 can be made of the same material. For example, the carrier 110 can be formed first and then the inner wall of the carrier 110 is hardened via specific techniques such as nitriding treatment to form the hardened layer 120.

It is worth mentioning that the material of the carrier 110 of the connecting body 10 should not be considered as a limitation in the present invention. For example, the carrier 110 can be a metallic member, that is, the connecting body 10 can be embodied as the metal connector 1 of the first preferred embodiment as shown in FIG. 1. Preferably, the carrier 110 of the connecting body 10 can be made of stainless steel material for facilitating the installation and application of the optical module optical interface assembly. Of course, those who skilled in the art would easily understand that the carrier 110 of the connecting body 10 can also be made of other materials such as alloy materials and polymer materials.

Figure 5A:
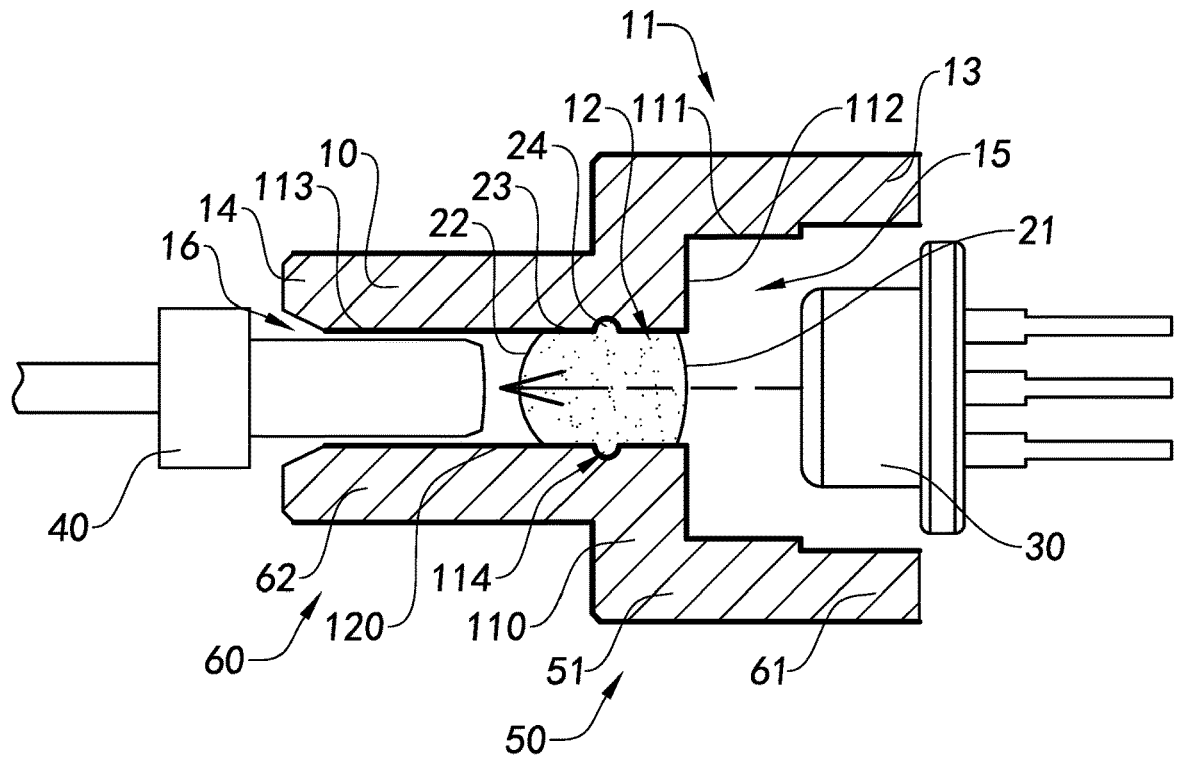
FIG. 5A is a sectional view of the optical module optical interface assembly with the optical lens being applied to a transmitting end according to the above preferred embodiment of the present invention.
Figure 5B:
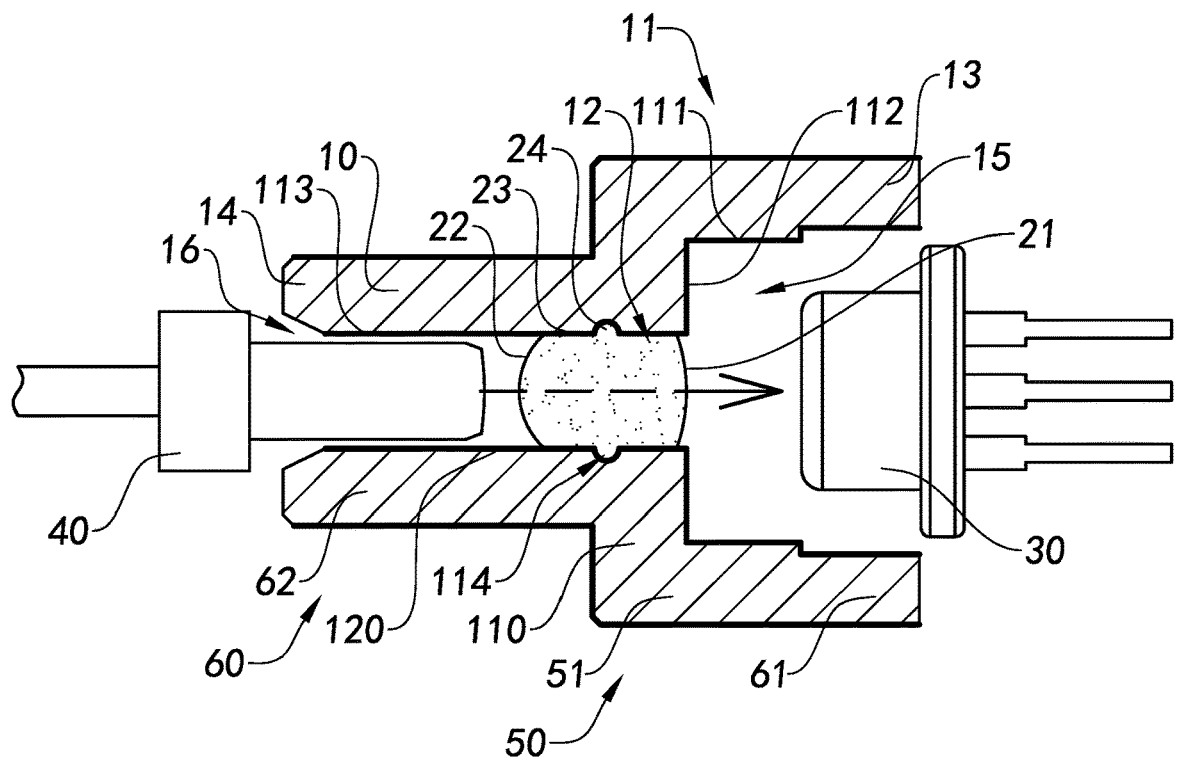
FIG. 5B is a sectional view of the optical module optical interface assembly with an optical lens being applied to a receiving end according to the above preferred embodiment of the present invention.
Figure 6:
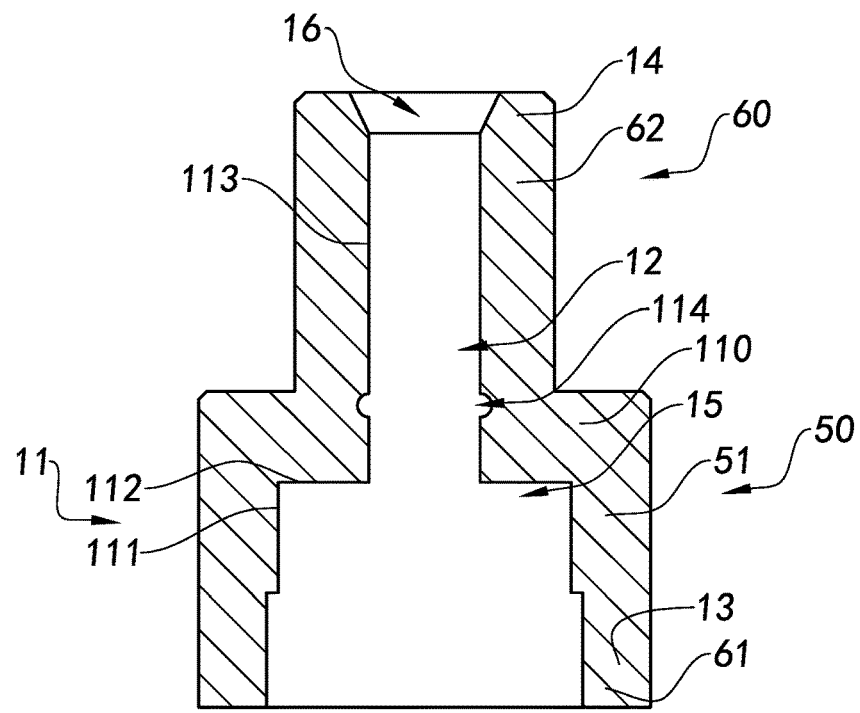
FIG. 6 is a schematic view of a step of manufacturing the optical module optical interface assembly with an optical lens according to the above preferred embodiment of the present invention, which illustrates a sectional view of a connecting body.
Figure 7:
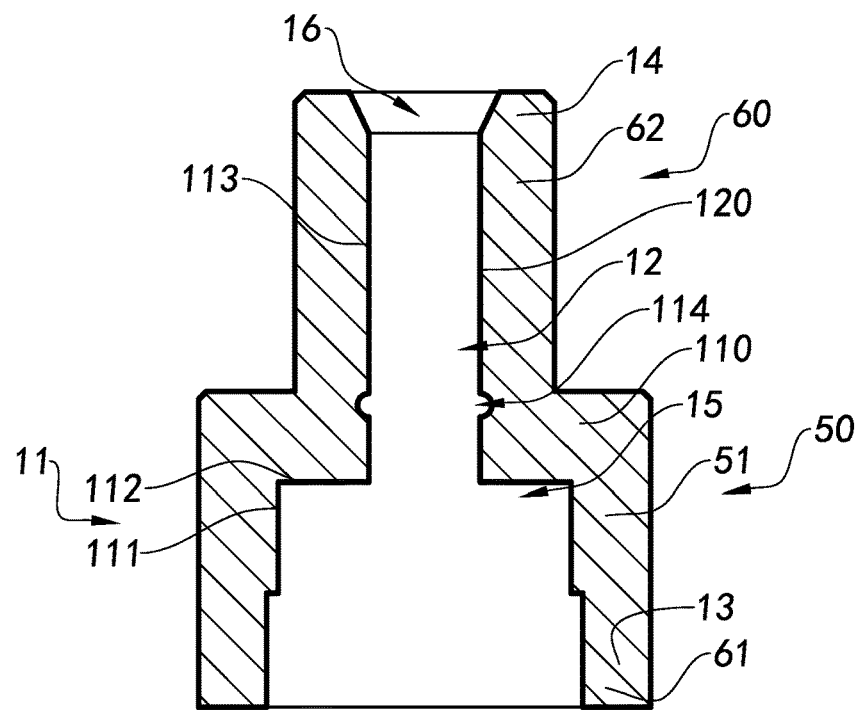
FIG. 7 is a schematic view of another step of manufacturing the optical module optical interface assembly with an optical lens according to the above preferred embodiment of the present invention, which illustrates that the connecting body is subjected to hardening treatment.
Figure 8:
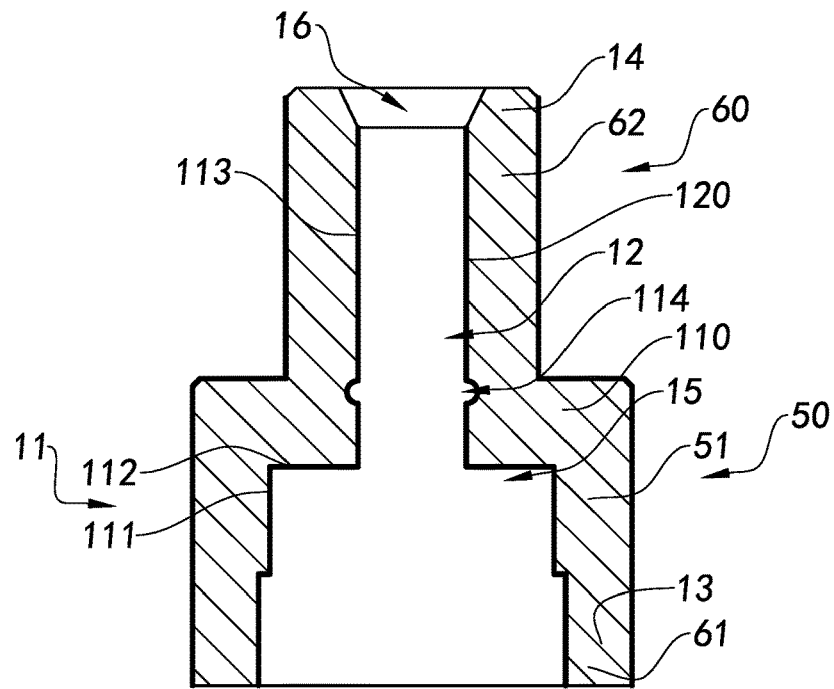
FIG. 8 is a schematic view of another step of manufacturing the optical module optical interface assembly with an optical lens according to the above preferred embodiment of the present invention, which illustrates that the hardened layer at the end portion of the connecting body is removed.

Referring to FIGS. 5A and 5B of the drawings, examples of the optical module optical interface assembly being applied as a transmitting end and a receiving end are shown respectively. In other words, the optical module optical interface assembly of the present invention can not only be applied to the transmitting end, but also be applied to the receiving end, such that there is no necessity to distinguish the types of the optical module optical interface assembly during the installation of the optical module optical interface assembly so as to facilitate usage thereof.

More specifically, referring to FIG. 5A, when the optical module optical interface assembly is used as the transmitting end, the light generated by the optical subassembly 30 can be collimated by the optical lens 20 when it passes through the optical lens 20, such that the light passing through the optical lens 20 can enter into the external fiber 40 and be transmitted by the external fiber 40. Referring to FIG. 5B, when the optical module optical interface assembly is used as the receiving end, the light transmitted by the external fiber 40 can be collimated by the optical lens 20 when it passes through the optical lens 20, such that the light passing through the optical lens 20 can be received by the optical subassembly 30. In other words, regardless of the optical module being implemented as a transmitting end or a receiving end, the optical lens 20 is capable of performing the optical collimation for the light passing through the optical lens 20 so as to guarantee the optical transmission capacity of fiber.

Referring to FIGS. 6 to 10 of the drawing of the present invention, a manufacturing process of the optical module optical interface assembly according to the above preferred embodiment of the present invention is illustrated.

In particular, first, the connecting body 10 and a molding material 80 for forming the optical lens 20 are provided.

More detailedly, the tubular carrier 110 is provided first, which can be made by inserting molding or milling by a milling machine. The technique for making the carrier 110 should not be considered a limitation in the present invention. Preferably, the carrier 110 has at least one positioning groove 114. Further, the surface of carrier 110 is subjected to hardening treatment. For example, the hardened layer 120 can be formed by nitriding the surface of the carrier 110 in order to increase the hardness of the surface of the connecting body 10, especially the hardness of the inner wall 11 of the connecting body 10, such that the accuracy of the optical module optical interface assembly can always be guaranteed no matter when the optical lens 20 is formed in the molding cavity 12 of the connecting body 10 to make the optical module optical interface assembly or when the optical module optical interface assembly is being utilized. Further, the hardened layer 120 on the first connecting end 13 and the second connecting end 14 of the connecting body 10 are removed. For example, the hardened layer 120 on the first connecting end 13 and the second connecting end 14 of the connecting body 10 can be removed by cutting or grinding, etc., so as to expose the carrier 110 on the first connecting end 13 and the second connecting end 14 of the connecting body 10, thereby facilitating the installation of the connecting body 10 via the first connecting end 13 and the second connecting end 14. In some embodiments, the inner wall 11 of the connecting body 10 can further be grinded to improve the accuracy of the optical module optical interface assembly.

Figure 9:
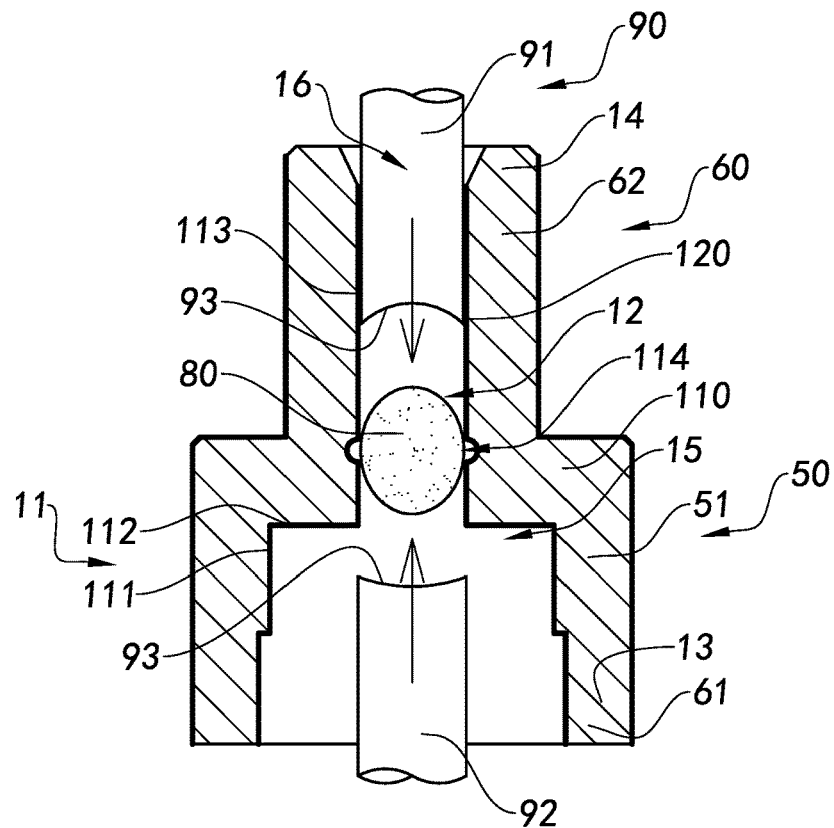
FIG. 9 is a schematic view of another step of manufacturing the optical module optical interface assembly with an optical lens according to the above preferred embodiment of the present invention, which illustrates that the optical lens is formed in the molding cavity of the connecting body.
Figure 10:
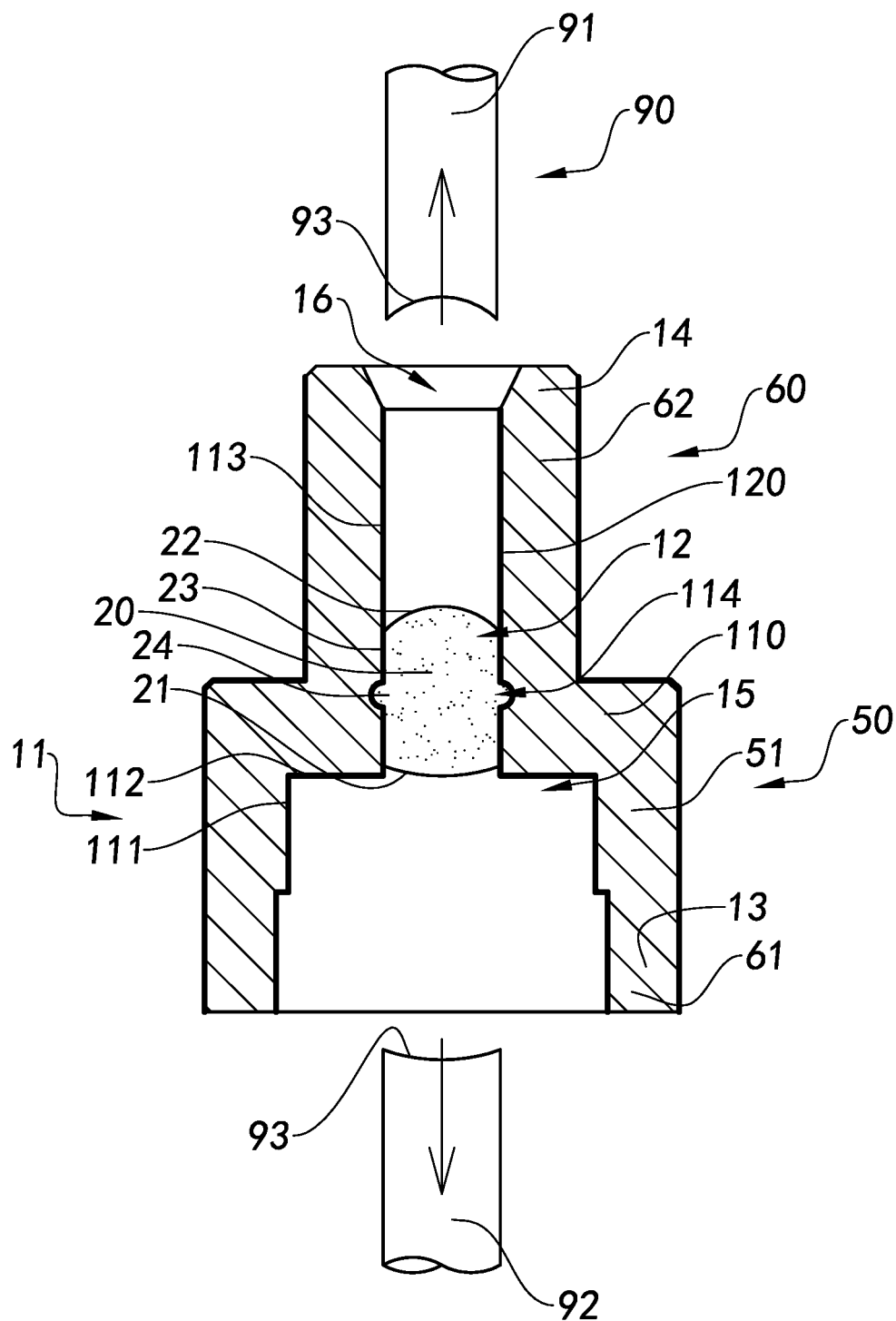
FIG. 10 is a schematic view of another step of manufacturing the optical module optical interface assembly with an optical lens according to the above preferred embodiment of the present invention, which illustrates the optical lens being formed in the molding cavity of the connecting body to make the optical module optical interface assembly.

Further referring to FIG. 9 and FIG. 10 of the drawings, the optical lens 20 is formed in the molding cavity 12 of the connecting body 10 by filling the molding material 80 into the molding cavity 12 of the connecting body 10 and acting on the molding material 80 by a first molding fixture 91 and a second molding fixture 92 at the first and second connecting end 14s of the connecting body 10 respectively. It is worth mentioning that the molding surface of the first and second molding fixtures 91, 92 determines the shapes of the first and second end surfaces 21, 22 of the optical lens 20. It could be easily understood that, in the process of compressing the molding material 80 by the first and second molding fixtures 91, 92 at the first connecting and second ends 13, 14 of the connecting body 10 respectively, the molding material 80 can also be heated, such that the optical lens 20 is formed in the molding cavity 12 of the connecting body 10 by the first and second molding fixtures 91, 92 via hot pressing technique to produce the optical module optical interface assembly. It is worth mentioning that, in the process of forming the optical lens 20 in the molding cavity 12 of the connecting body 10 by the first and second molding fixture 92, the molding material 80 can also be added into a molding die 90 composed of the first and second molding fixtures 91, 92 with respect to the molding cavity 12 as a reference, in order to further improve the accuracy of the optical module optical interface assembly.

In other words, the molding die 90 comprises the first molding fixture 91 and the second molding fixture 92, which are arranged for forming the optical lens 20 in the molding cavity 12 of the connecting body 10.

Figure 12:
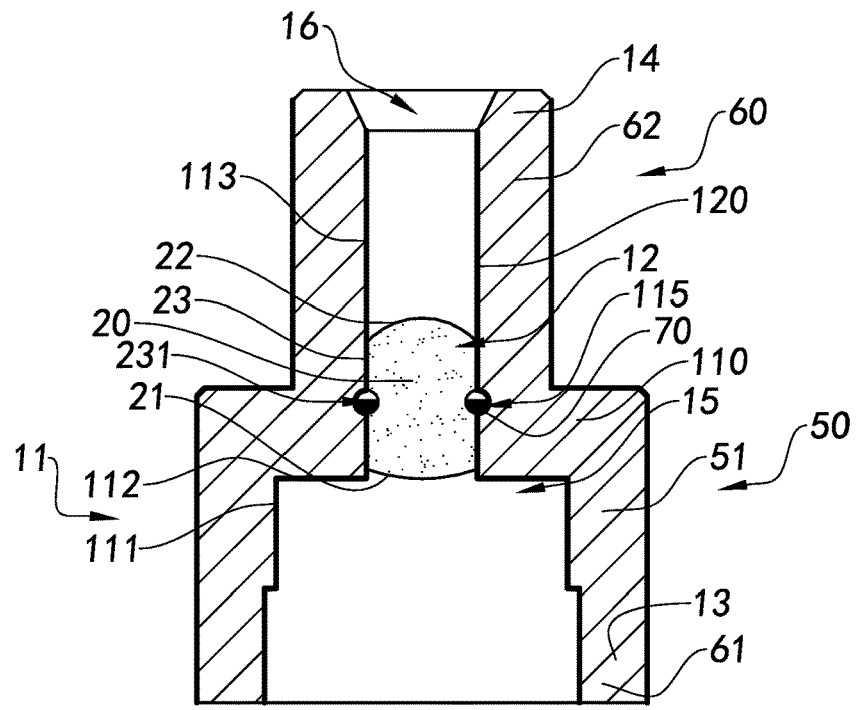
FIG. 12 is a sectional view of a second alternative mode of the optical module optical interface assembly of the above preferred embodiment of the present invention.

Referring to FIG. 12 of the drawings, an alternative mode of the optical module optical interface assembly according to the above preferred embodiment of the present invention is illustrated, wherein the connecting body 10 has at least one first retention groove 115 formed on the inner wall 11 thereof, each of which is communicated with molding cavity 12. The optical lens 20 has at least one second retention groove 231 formed on the peripheral wall 23 thereof. The optical module optical interface assembly further comprises at least one retention element 70, wherein when the optical lens 20 is mounted in the molding cavity 12 of the connecting body 10, at least one of the second retention grooves 231 of the optical lens 20 is corresponding to at least one of the first retention grooves 115 of the connecting body 10, and the retention element 70 is retained in the first retention groove 115 of the connecting body 10 and second retention groove 231 of the optical lens 20 simultaneously in such a manner that the optical lens 20 is retained in the molding cavity 12 of the connecting body 10.

In other words, in the optical module optical interface assembly of this embodiment of the present invention, the optical lens 20 is not formed in the molding cavity 12 of the connecting body 10. Instead, the optical lens 20 is mounted in the molding cavity 12 of the connecting body 10 after the connecting body 10 and the optical lens 20 are separately prepared.

Preferably, when the optical lens 20 is mounted in the molding cavity 12 of the connecting body 10, the second retention grooves 231 of the optical lens 20 are corresponding to the first retention groove 115 of the connecting body 10 respectively.

In a specific example of the optical module optical interface assembly in the embodiment, the retention element 70 can be formed by curing of an adhesive. More specifically, in the process of manufacturing the optical module optical interface assembly of the present invention, the adhesive in liquid formation can be firstly applied in each of the second retention grooves 231 of the optical lens 20. For example, the liquid adhesive can be added into each of the second retention grooves 231 of the optical lens 20 by a glue dispensing machine. Then, the optical lens 20 is mounted in the molding cavity 12 of the connecting body 10 and the second retention grooves 231 of the optical lens 20 are corresponding to the first retention grooves 115 of the connecting body 10 respectively, such that a portion of the adhesive in each of the second retention grooves 231 of the optical lens 20 can flow to the corresponding first retention groove 115 of the connecting body 10. Then, after the adhesive is solidified, the retention element 70 simultaneously retained in the first retention grooves 115 of the connecting body 10 and second retention grooves 231 of the optical lens 20 is formed to affix the optical lens 20 with the connecting body 10. Of course, the adhesive can be firstly applied to the first retention grooves 115 of the connecting body 10, such that when the optical lens 20 is mounted in the molding cavity 12 of the connecting body 10, a portion of the adhesive in the first retention grooves 115 of the connecting body 10 can flow to the second retention grooves 231 of the optical lens 20.

It can be understood that the method for which the adhesive is cured in the first retention grooves 115 of the connecting body 10 and second retention grooves 231 of the optical lens 20 should not be considered as a limitation in the present invention. For example, the adhesive can be solidified by heat curing or cooling curing, which depends on the types of the adhesive. Of course, the substances for forming the retention element 70 can be other materials, not limited to the adhesive, which are in a stable solid formation after curing.

Figure 13:
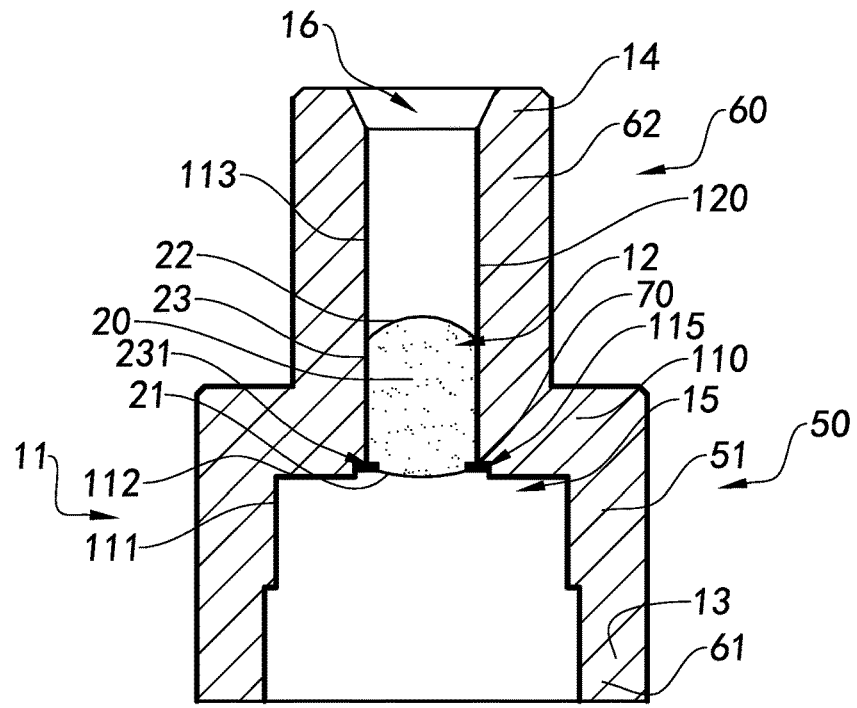
FIG. 13 is a sectional view of a third alternative mode of the optical module optical interface assembly of the above preferred embodiment of the present invention.

Referring to FIG. 13 of the drawings, another alternative mode of the optical module optical interface assembly according to the above preferred embodiment of the present invention is illustrated, wherein the first retention grooves 115 of the connecting body 10 are formed at the joint portion of the second inner wall 112 and third inner wall 113, such that the first retention grooves 115 are communicated with the first receiving cavity 15. The second retention grooves 231 of the optical lens 20 are formed at the joint portion of the first end surface 21 and the peripheral wall 23. When the optical lens 20 is mounted in the molding cavity 12 of the connecting body 10, the first retention grooves 115 of the connecting body 10 and the second retention grooves 231 of the optical lens 20 are corresponding with each other and both communicated with the first receiving cavity 15, such that the adhesive can be applied in the first retention grooves 115 of the connecting body 10 and the second retention grooves 231 of the optical lens 20 through the first receiving cavity 15 so as to form the retention element 70 retained in the first retention grooves 115 of the connecting body 10 and second retention grooves 231 of the optical lens 20 simultaneously after its curing, thereby affixing the optical lens 20 with the connecting body 10 to produce the optical module optical interface assembly.

Figure 14:
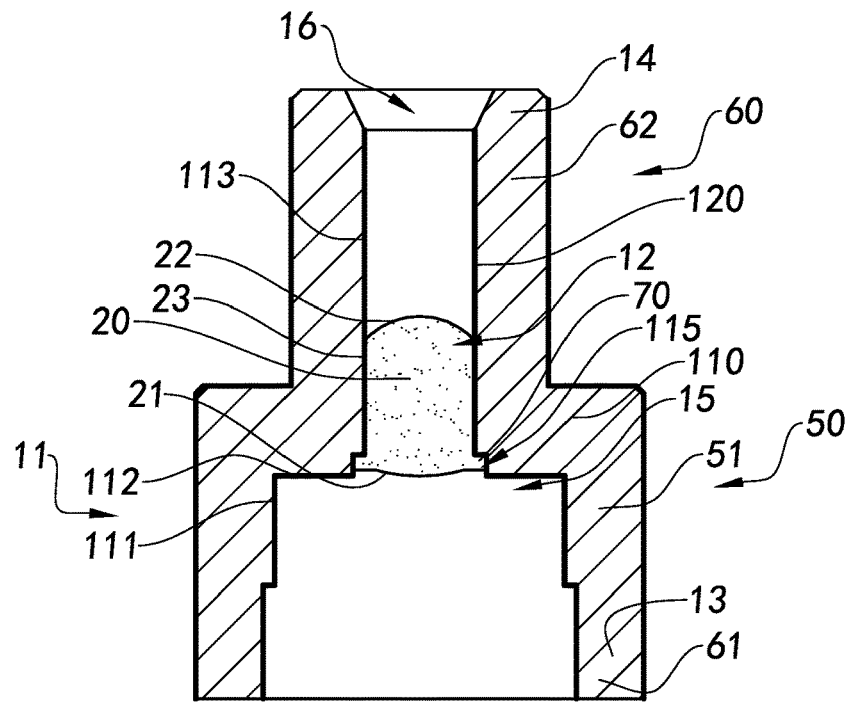
FIG. 14 is a sectional view of a fourth alternative mode of the optical module optical interface assembly of the above preferred embodiment of the present invention.
Figure 15:
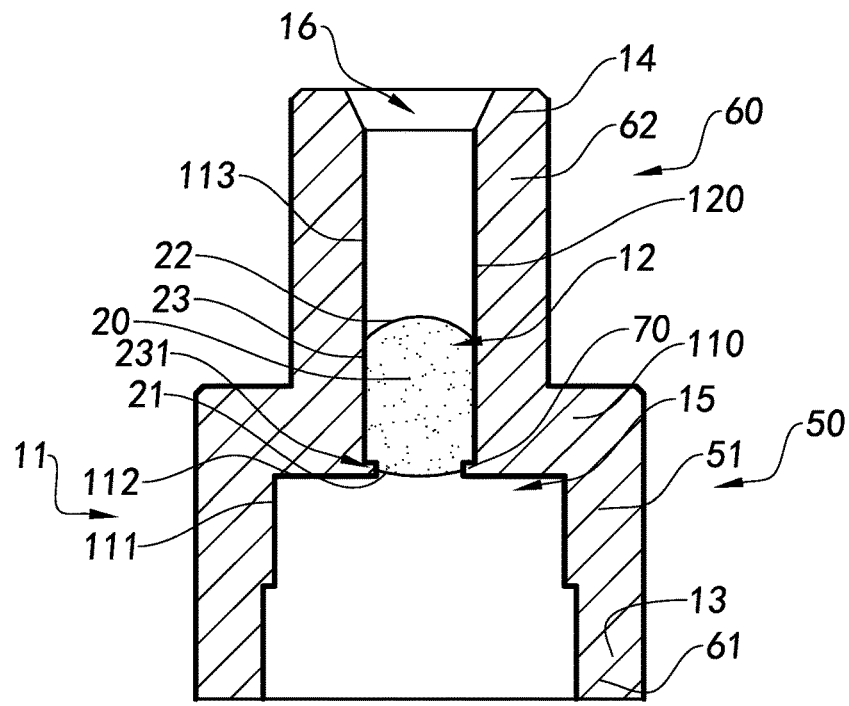
FIG. 15 is a sectional view of a fifth alternative mode of the optical module optical interface assembly of the above preferred embodiment of the present invention.

Referring to FIG. 14 of the drawings, another alternative mode of the optical module optical interface assembly according to the above preferred embodiment of the present invention is illustrated, wherein the retention element 70 is integrally extended from the first end surface 21 of the optical lens 20. When the optical lens 20 is mounted in the molding cavity 12 of the connecting body 10, the retention element 70 is retained in the first retention grooves 115 of the connecting body 10 so as to affix the optical lens 20 with the connecting body 10 to produce the optical module optical interface assembly.

Referring to FIG. 14 of the drawings, another alternative mode of the optical module optical interface assembly according to the above preferred embodiment of the present invention is illustrated, wherein the retention element 70 is integrally extended from the inner wall of the connecting body 10, such that when the optical lens 20 is mounted in the molding cavity 12 of the connecting body 10, the retention element 70 is retained in the second retention grooves 231 of the optical lens 20 so as to affix the optical lens 20 with the connecting body 10 to produce the optical module optical interface assembly.

According to another aspect of the present invention, the present invention further provided a manufacturing method of an optical module optical interface assembly with an optical lens 20, which comprises the following steps:

(a) providing a connecting body 10 which has a molding cavity 12;

(b) filling a molding material 80 in the molding cavity 12 of the connecting body 10; and (c) compressing the molding material 80 and forming an optical lens 20 within the molding cavity 12 of the connecting body 10 when the molding material 80 is solidified, so as to produce the optical module optical interface assembly.

According to another aspect of the present invention, the present invention further provides a manufacturing method of an optical module optical interface assembly with an optical lens 20, wherein the manufacturing method comprises the following steps:

(A) providing a connecting body 10 which has a molding cavity 12;

(B) providing an optical lens 20; and (C) mounting the optical lens 20 in the molding cavity 12 of the connecting body 10 to made the optical module optical interface assembly.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical module optical interface assembly with optical lens, comprising:

an optical lens, which has a first end surface and a second end surface corresponding to said first end surface;

a connecting body having a molding cavity, wherein said optical lens is mounted in said molding cavity of said connecting body, wherein said connecting body has an inner wall defining said molding cavity, wherein said optical lens has a side wall which is in contact with said inner wall of said connecting body, wherein said connecting body has two end portions arranged for mounting an optical subassembly and an external fiber respectively, wherein said first end surface faces towards one end portion of said two end portions for mounting said optical subassembly and said second end surface faces towards the other end portion of said two end portions for mounting said external fiber; and at least one retention element, wherein said connecting body has one or more first retention grooves communicating with said molding cavity and said optical lens has one or more second retention grooves corresponding to said one or more first retention grooves respectively, wherein said at least one retention element is formed in said one or more first retention grooves and said one or more second retention grooves respectively, such that said optical lens is mounted in said molding cavity of said connecting body.

2. The optical module optical interface assembly, as recited in claim 1, wherein said one or more second retention grooves of said optical lens are corresponding to said one or more first retention grooves of said connecting body respectively, and said one or more retention elements are respectively formed by curing an adhesive in said one or more first retention grooves and said one or more second retention grooves simultaneously.

3. The optical module optical interface assembly, as recited in claim 2, wherein said optical lens is mounted in said molding cavity of said connecting body, wherein said connecting body has only one said first retention groove and said optical lens has only one said second retention groove, wherein said first retention groove of said connecting body has a ring shape and said second retention groove has a ring shape, wherein said at least one retention element is formed at a portion of said first retention groove and a portion of said second retention groove, wherein said second retention groove is formed at a middle potion of said optical lens.

4. The optical module optical interface assembly, as recited in claim 3, wherein said second retention groove is formed at one of said first end surface and said second end surface of said optical lens.

\* \* \* \* \*